United States Patent
Izukawa et al.

(10) Patent No.: US 10,384,573 B2
(45) Date of Patent: Aug. 20, 2019

(54) VEHICLE SEAT

(71) Applicant: TOYOTA BOSHOKU KABUSHIKI KAISHA, Aichi-ken (JP)

(72) Inventors: Hideyuki Izukawa, Aichi-ken (JP); Takenori Ojika, Aichi-ken (JP); Shigeru Ishino, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 15/845,285

(22) Filed: Dec. 18, 2017

(65) Prior Publication Data

US 2018/0170225 A1 Jun. 21, 2018

(30) Foreign Application Priority Data

Dec. 21, 2016 (JP) .................................. 2016-247642

(51) Int. Cl.
*B60N 2/58* (2006.01)
*B68G 7/05* (2006.01)

(52) U.S. Cl.
CPC ............. *B60N 2/5883* (2013.01); *B68G 7/05* (2013.01); *B60N 2/5891* (2013.01)

(58) Field of Classification Search
CPC ...... B60N 2/5883; B60N 2/5891; B60N 2/58; B60N 2/5816; B60N 2/60; B60N 2/6018; B60N 2/609; B68G 7/05
USPC ....... 297/452.58, 0.6, 0.42, 0.43, 0.46, 0.47, 297/0.62
See application file for complete search history.

(56) References Cited

U.S. PATENT DOCUMENTS

| | | | | |
|---|---|---|---|---|
| 5,607,201 A * | 3/1997 | Irie | ........................ | A47C 7/24 297/452.62 |
| 8,690,257 B2 * | 4/2014 | Stiller | .................. | B60N 2/5825 24/297 |
| 2008/0246325 A1 * | 10/2008 | Pfahler | ................ | B60N 2/5635 297/452.42 |
| 2011/0115276 A1 * | 5/2011 | Glaser | .................. | B60N 2/5642 297/452.42 |
| 2012/0261974 A1 * | 10/2012 | Yoshizawa | ........... | B60N 2/5642 297/452.42 |
| 2016/0107551 A1 * | 4/2016 | Nii | ....................... | B60N 2/5678 297/180.13 |
| 2016/0129818 A1 | 5/2016 | Sahashi | | |

(Continued)

FOREIGN PATENT DOCUMENTS

JP 2016-87196 5/2016

*Primary Examiner* — Mark R Wendell
(74) *Attorney, Agent, or Firm* — Greenblum & Bernstein, P.L.C.

(57) ABSTRACT

A vehicle seat includes a seat pad that defines an outer shape of the vehicle seat and elastically supports a body of a seated occupant; and a seat cover that is formed by sewing a plurality of parts, the seat cover covering a seating surface of the seat pad. The seating surface includes a recessed surface portion that is recessed in a thickness direction of the seat pad. The seat cover includes a covering material and a first cover pad that is disposed on and fixed to a reverse surface of the covering material. A plurality of through holes is provided in the first cover pad in a portion of the seat cover, the plurality of through holes extending through the first cover pad in a thickness direction of the first cover pad, and the portion of the seat cover corresponding to the recessed surface portion.

6 Claims, 5 Drawing Sheets

(56) References Cited

U.S. PATENT DOCUMENTS

| | | | |
|---|---|---|---|
| 2017/0113588 A1* | 4/2017 | Ochiai | B60N 2/5883 |
| 2017/0210261 A1* | 7/2017 | Ishii | B60N 2/58 |
| 2018/0022252 A1* | 1/2018 | Arata | B60N 2/58 |
| | | | 297/452.42 |

* cited by examiner

VEHICLE SEAT

INCORPORATION BY REFERENCE

The disclosure of Japanese Patent Application No. 2016-247642 filed on Dec. 21, 2016 including the specification, drawings and abstract is incorporated herein by reference in its entirety.

BACKGROUND

1. Technical Field

The disclosure relates to a vehicle seat.

2. Description of Related Art

Conventionally, a vehicle seat is formed by covering a seat pad, which is a cushion material that defines an external shape of a seat, with a seat cover as a covering material. In the technique disclosed in Japanese Patent Application Publication No. 2016-87196 (JP 2016-87196 A), a laminated body (layered product) is formed by laminating fabric with a urethane slab pad and reverse base cloth in the stated order (i.e., by disposing the urethane slab pad and the reverse base cloth in the stated order on the fabric), and the laminated body is cut into a plurality of parts in specified shapes. Then, the parts are connected and integrated by sewing to form the seat cover. The parts are connected by sewing so that the seat cover more closely contacts the seat pad with a three-dimensional shape and thus the appearance of the seat cover is improved. In general, in the seat cover, a fold line of a valley fold or a mountain fold is generated along a sewing line. Thus, the seat cover is in close contact with a recessed surface or a protruding surface of the seat pad.

SUMMARY

It may be desired that a portion of the seat cover, which is not provided with the sewing line, should be in close contact with a recessed surface portion of the seat pad without forming creases on the seat cover, due to a request regarding an external design of the seat cover. The recessed surface portion is a portion that is recessed in an inward direction of the seat pad. It has been demanded to meet the above request without complicating a structure of the vehicle seat.

The disclosure provides a vehicle seat having a simple structure that makes it possible to realize a favorable external appearance of a recessed surface portion in a portion of the seat cover, which is not provided with a sewing line.

A first aspect of the disclosure relates to a vehicle seat including a seat pad that defines an outer shape of the vehicle seat and elastically supports a body of a seated occupant; and a seat cover that is formed by sewing a plurality of parts, the seat cover covering a seating surface of the seat pad. The seating surface includes a recessed surface portion that is recessed in a thickness direction of the seat pad. The seat cover includes a covering material and a first cover pad that is disposed on and fixed to a reverse surface of the covering material. A plurality of through holes is provided in the first cover pad in a portion of the seat cover, the plurality of through holes extending through the first cover pad in a thickness direction of the first cover pad, and the portion of the seat cover corresponding to the recessed surface portion.

In the first aspect, when the first cover pad serving as a reverse surface portion of the seat cover is disposed along the recessed surface portion of the seat pad, a shearing force that is generated due to bending and is applied from the first cover pad to the covering material is reduced due to presence of the through holes. Accordingly, generation of creases in the covering material is suppressed. Thus, the vehicle seat with a favorable external appearance can be provided.

According to a second aspect of the disclosure, in the above aspect, the recessed surface portion may be covered with the seat cover such that sewing lines face the recessed surface portion, the plurality of parts being sewn at the sewing lines; the sewing lines may be formed on a same imaginary line such that an isolation portion that is not sewn is provided between the sewing lines; and the plurality of through holes may be provided in the first cover pad in an isolation portion part, the isolation portion part being disposed to correspond to the isolation portion.

The seat cover is likely to be folded along a continuous sewing line and thus a fold line is likely to be formed along the continuous sewing line. However, in the second aspect, even when the sewing lines are formed on the same imaginary line such that the isolation portion that is not sewn is provided between the sewing lines, and the isolation portion part disposed to correspond to the isolation portion faces the recessed surface portion, generation of creases in the covering material in the isolation portion part is suppressed due to presence of the through holes. Therefore, even when specific design, in which the portion that is not sewn is provided between the sewing lines, is employed, the vehicle seat with the favorable external appearance can be provided.

According to a third aspect of the disclosure, in the above aspect, a diameter of each of the plurality of through holes may be smaller than a thickness of the first cover pad.

In the third aspect, the diameter of each of the through holes is smaller than the thickness of the first cover pad. Therefore, presence of the through holes is unlikely to be felt from the covering material-side and thus the through holes do not worsen texture of a seat surface.

According to a fourth aspect of the disclosure, a second cover pad may be disposed on a surface of the first cover pad, the surface of the first cover pad being on a side opposite to a side where the covering material is disposed; and the plurality of through holes may be provided in the second cover pad.

In the fourth aspect, when the second cover pad serving as the reverse surface portion of the seat cover is disposed along the recessed surface portion of the seat pad, the shearing force that is generated due to bending and is applied from the first cover pad to the covering material is further reduced as compared to the first aspect. This is because the shearing force, which is generated due to bending and is applied from the seat pad to the first cover pad, is reduced due to presence of the second cover pad provided with the through holes.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

FIG. 1 to FIG. 5 each shows an embodiment of the disclosure. This embodiment is an example in which the disclosure is applied to a seat back 3 of a vehicle seat 1. Arrows in the drawings indicate directions of a vehicle and the vehicle seat 1 when the vehicle seat 1 is installed in the vehicle. In the following description, the description regarding the directions will be made based on these directions.

Figure 1:
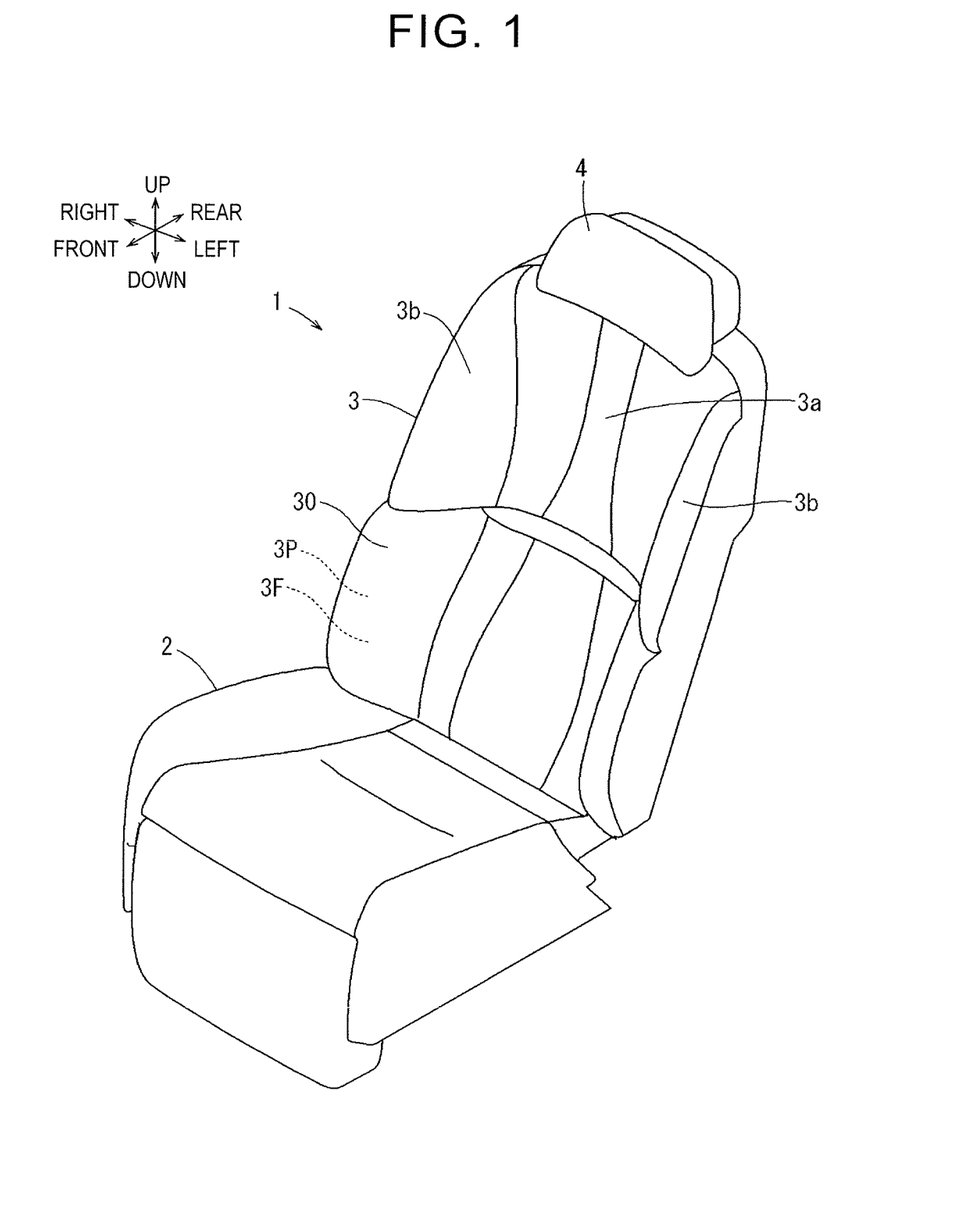
FIG. 1 is a perspective view illustrating a vehicle seat in an embodiment of the disclosure when the vehicle seat is seen obliquely from the front.

The vehicle seat 1 of this embodiment includes a seat cushion 2 that supports buttocks and thighs of a body of a seated occupant; the seat back 3 that supports a back of the seated occupant; and a headrest 4 that supports a head of the seated occupant. A lower end portion on each side of the seat back 3 is coupled to a rear end portion of the seat cushion 2 via a recliner (not shown). Here, the vehicle seat 1 may be regarded as "a vehicle seat" according to the disclosure.

Figure 2:
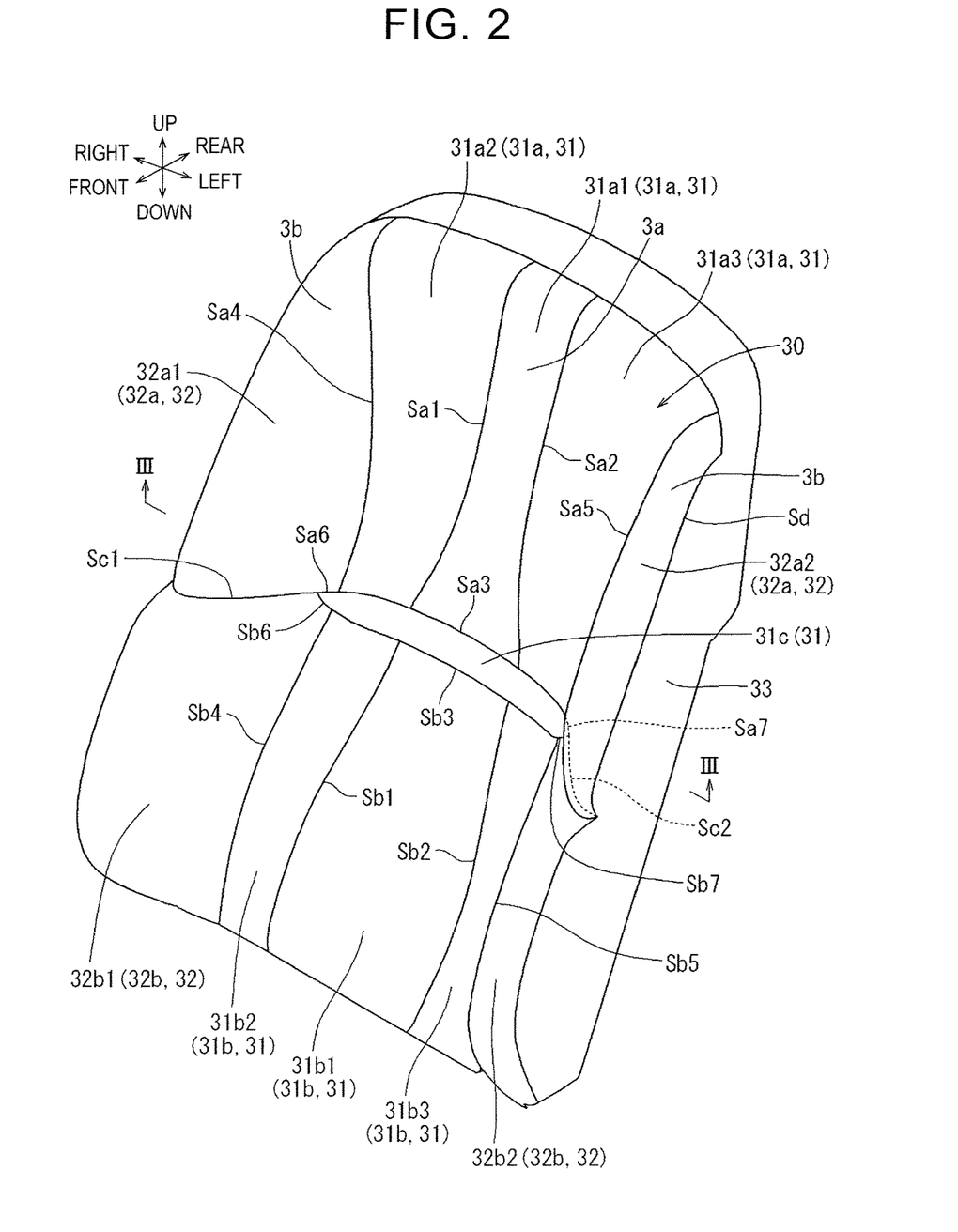
FIG. 2 is a perspective view illustrating a seat back of the vehicle seat when the seat back is seen obliquely from the front and a headrest is not illustrated.
Figure 3:
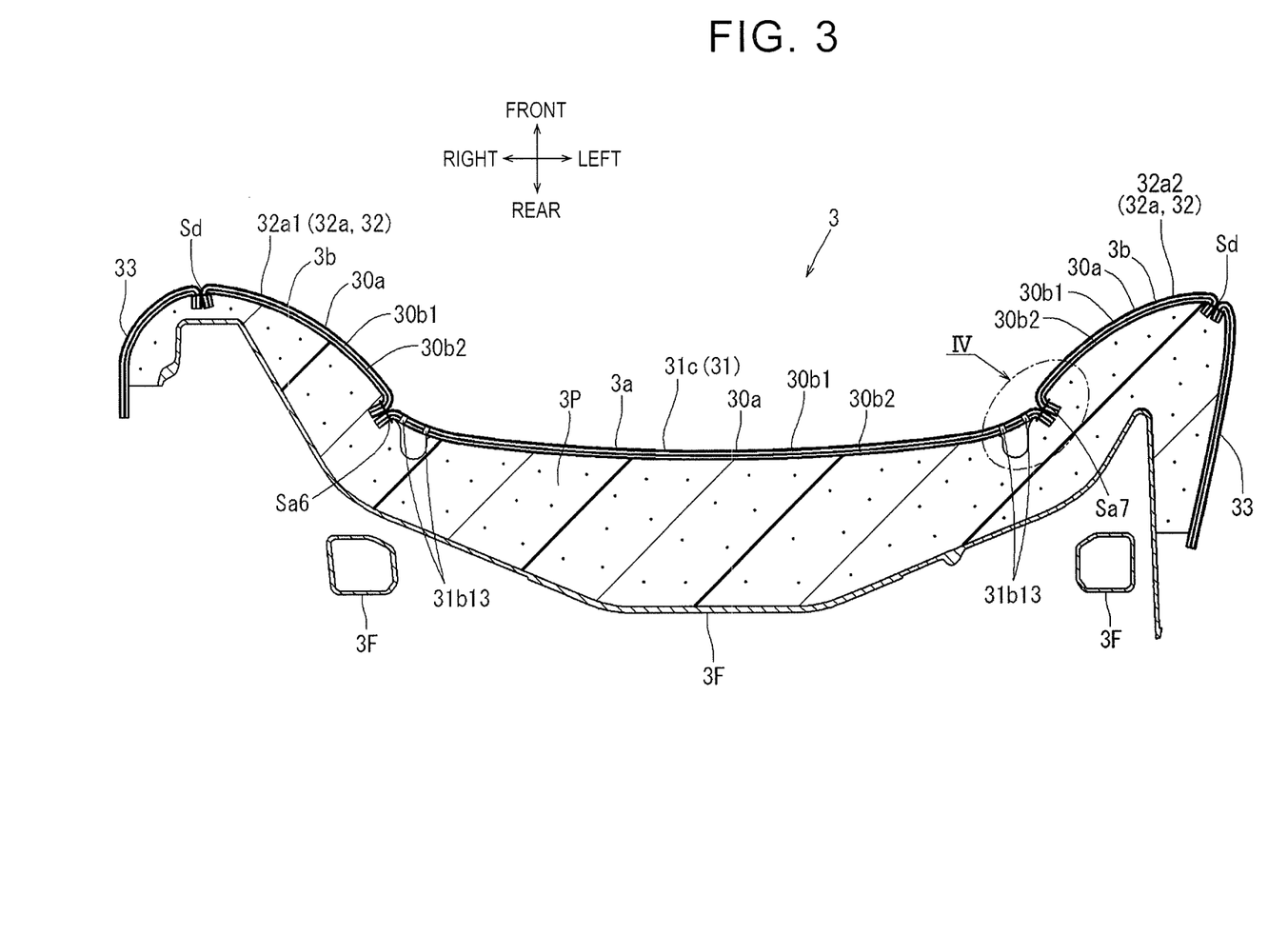
FIG. 3 is a sectional view that is taken along a line III-III in FIG. 2 and seen in a direction indicated by arrows.

As shown in FIG. 1 to FIG. 3, the seat back 3 has a structure in which a back pad 3P, which is made of urethane foam and is a cushion material defining an outer shape of the seat back 3, is placed on a back frame 3F constituting a framework of the seat back 3, and the back pad 3P and the back frame 3F are covered with a back cover 30 as a covering material. In addition, the seat back 3 includes a main portion 3a as a central portion of a front surface of the seat back 3; and bolster portions 3b as side portions of the front surface of the seat back 3. In a state where the seat back 3 is raised, the main portion 3a contacts a reverse surface of the seated occupant and supports an upper body part of the seated occupant. The bolster portions 3b are respectively disposed on both sides of the main portion 3a in a right-left direction, and are formed to be projected forward with respect to the main portion 3a. The bolster portions 3b are respectively located on lateral sides of the upper body part of the seated occupant in normal times, and respectively contact and support side portions of the upper body part of the seated occupant during cornering of the vehicle so as to prevent the upper body part of the seated occupant from swaying in the right-left direction. A portion of the back pad 3P on a seating surface-side, which corresponds to the main portion 3a and the bolster portions 3b, is formed as a recessed surface portion whose horizontal cross section is recessed rearward (in a thickness direction of the back pad 3P). Here, the back pad 3P and the back cover 30 may be regarded as "a seat pad" and "a seat cover", respectively.

As shown in FIG. 2, the back cover 30 is an integrated body formed by sewing separate parts together. The back cover 30 includes a main portion cover 31 that corresponds to the main portion 3a, a side portion cover 32 that corresponds to the bolster portions 3b, and a surrounding portion cover 33 that corresponds to an upper surface portion and right and left side surface portions of the seat back 3. The main portion cover 31 includes an upper main portion cover 31a that corresponds to an upper portion of the main portion 3a; a lower main portion cover 31b that corresponds to a lower portion of the main portion 3a; and an intermediate main portion cover 31c that is disposed between the upper main portion cover 31a and the lower main portion cover 31b. The upper main portion cover 31a includes an upper intermediate main portion cover 31a1 that is located at a center in the right-left direction; an upper right main portion cover 31a2 that is located on a right side of the upper intermediate main portion cover 31a1; and an upper left main portion cover 31a3 that is located on a left side of the upper intermediate main portion cover 31a1. A left end portion of the upper right main portion cover 31a2 and a right end portion of the upper intermediate main portion cover 31a1 are sewn together at a first upper sewing line Sa1. A left end portion of the upper intermediate main portion cover 31a1 and a right end portion of the upper left main portion cover 31a3 are sewn together at a second upper sewing line Sa2.

As shown in FIG. 2, the lower main portion cover 31b includes a lower intermediate main portion cover 31b1 that is located at the center in the right-left direction; a lower right main portion cover 31b2 that is located on a right side of the lower intermediate main portion cover 31b1; and a lower left main portion cover 31b3 that is located on a left side of the lower intermediate main portion cover 31b1. A left end portion of the lower right main portion cover 31b2 and a right end portion of the lower intermediate main portion cover 31b1 are sewn together at a first lower sewing line Sb1. A left end portion of the lower intermediate main portion cover 31b1 and a right end portion of the lower left main portion cover 31b3 are sewn together at a second lower sewing line Sb2. The intermediate main portion cover 31c is disposed at a center of the main portion 3a in an up-down direction and extends in the right-left direction. An upper end portion of the intermediate main portion cover 31c and a lower end portion of the upper main portion cover 31a are sewn together at a third upper sewing line Sa3. A lower end portion of the intermediate main portion cover 31c and an upper end portion of the lower main portion cover 31b are sewn together at a third lower sewing line Sb3. Here, the intermediate main portion cover 31c may be regarded as "an isolation portion part".

As shown in FIG. 2, the side portion cover 32 includes an upper right side cover 32a1 that corresponds to an upper portion of the bolster portion 3b on a right side; and a lower right side cover 32b1 that corresponds to a lower portion of the bolster portion 3b on the right side. Further, the side portion cover 32 includes an upper left side cover 32a2 that corresponds to an upper portion of the bolster portion 3b on a left side; and a lower left side cover 32b2 that corresponds to a lower portion of the bolster portion 3b on the left side. A left end portion of the upper right side cover 32a1 and a right end portion of the upper main portion cover 31a (a right end portion of the upper right main portion cover 31a2) are sewn together at a fourth upper sewing line Sa4. A left end portion of the upper main portion cover 31a (a left end portion of the upper left main portion cover 31a3) and a right end portion of the upper left side cover 32a2 are sewn together at a fifth upper sewing line Sa5. Similarly, a left end portion of the lower right side cover 32b1 and a right end portion of the lower main portion cover 31b (a right end portion of the lower right main portion cover 31b2) are sewn together at a fourth lower sewing line Sb4. A left end portion of the lower main portion cover 31b (a left end portion of the lower left main portion cover 31b3) and a right end portion of the lower left side cover 32b2 are sewn together at a fifth lower sewing line Sb5.

As shown in FIG. 2, a left end portion of a lower end portion of the upper right side cover 32a1 and a right end portion of the upper end portion of the intermediate main portion cover 31c are sewn together at a sixth upper sewing line Sa6. A right end portion of the lower end portion of the upper right side cover 32a1 and a right end portion of an upper end portion of the lower right side cover 32b1 are sewn together at a first intermediate sewing line Sc1. A left end portion of the upper end portion of the lower right side cover 32b1 and a right end portion of the lower end portion of the intermediate main portion cover 31c are sewn together at a sixth lower sewing line Sb6. Similarly, a right end portion of a lower end portion of the upper left side cover 32a2 and a left end portion of the upper end portion of the intermediate main portion cover 31c are sewn together at a seventh upper sewing line Sa7. A left end portion of the lower end portion of the upper left side cover 32a2 and a left end portion of an upper end portion of the lower left side cover 32b2 are sewn together at a second intermediate sewing line Sc2. A right end portion of the upper end portion of the lower left side cover 32b2 and a left end portion of the lower end portion of the intermediate main portion cover 31c are sewn together at a seventh lower sewing line Sb7. In this way, the main portion cover 31 and the side portion cover 32 are integrated. Here, the first upper sewing line Sa1 and the first lower sewing line Sb1 are located on the same imaginary line, the second upper sewing line Sa2 and the second lower sewing line Sb2 are located on the same imaginary line, the fourth upper sewing line Sa4 and the fourth lower sewing line Sb4 are located on the same imaginary line, and the fifth upper sewing line Sa5 and the fifth lower sewing line Sb5 are located on the same imaginary line. In addition, the first upper sewing line Sa1 is not continuous with the first lower sewing line Sb1 due to the intermediate main portion cover 31c interposed therebetween, the second upper sewing line Sa2 is not continuous with the second lower sewing line Sb2 due to the intermediate main portion cover 31c interposed therebetween, the fourth upper sewing line Sa4 is not continuous with the fourth lower sewing line Sb4 due to the intermediate main portion cover 31c interposed therebetween, and the fifth upper sewing line Sa5 is not continuous with the fifth lower sewing line Sb5 due to the intermediate main portion cover 31c interposed therebetween. In particular, a portion where a right end portion of the intermediate main portion cover 31c is projected rightward from the imaginary line that connects the fourth upper sewing line Sa4 and the fourth lower sewing line Sb4 is a specific design portion. Similarly, a portion where a left end portion of the intermediate main portion cover 31c is projected leftward from the imaginary line that connects the fifth upper sewing line Sa5 and the fifth lower sewing line Sb5 is a specific design portion. The surrounding portion cover 33 is sewn to an upper end portion and right and left end portions of the main portion cover 31 and the side portion cover 32 at an outer periphery sewing line Sd, the main portion cover 31 and the side portion cover 32 being integrated. In this way, the back cover 30 is formed. Here, the fourth upper sewing line Sa4 and the fourth lower sewing line Sb4 may be regarded as "sewing lines" according to the disclosure, and the fifth upper sewing line Sa5 and the fifth lower sewing line Sb5 may be regarded as "sewing lines" according to the disclosure.

Figure 4:
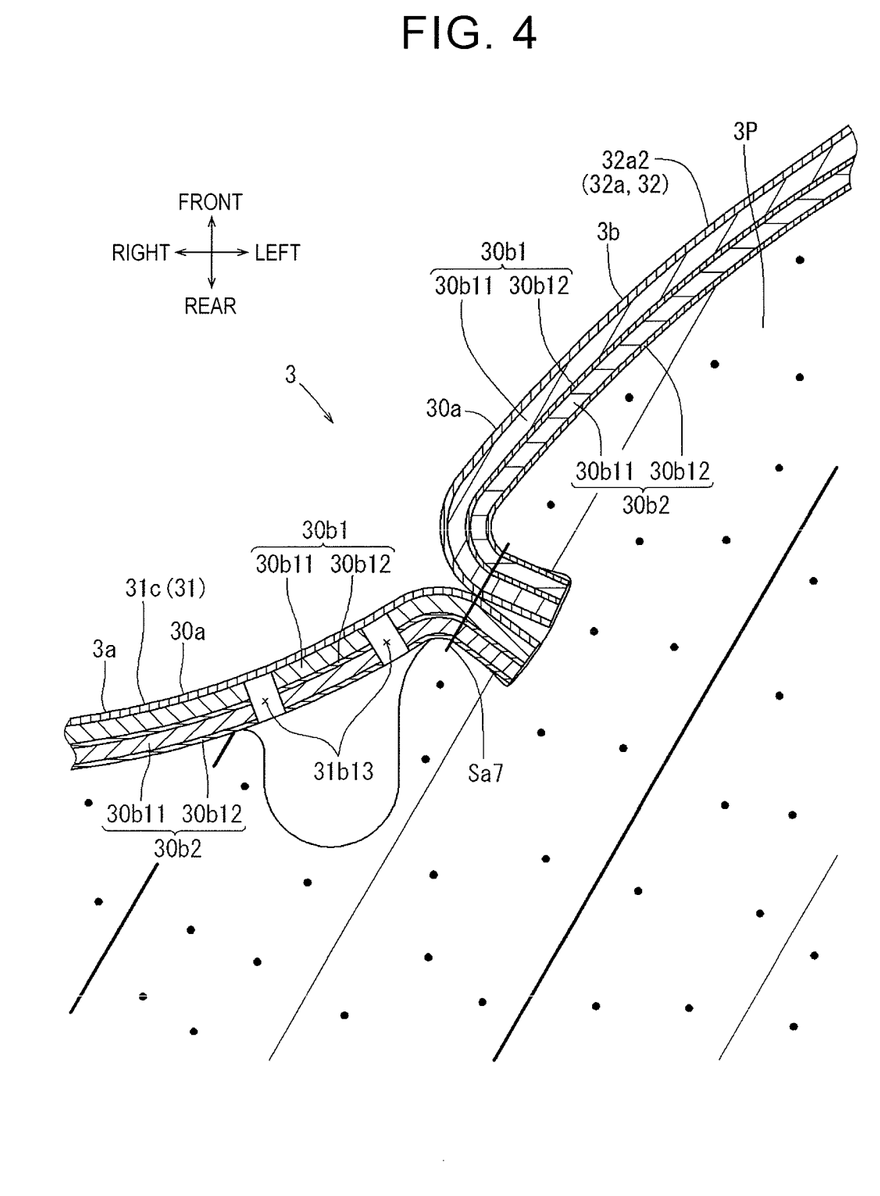
FIG. 4 is an enlarged view of a portion IV in FIG. 3.

As shown in FIG. 3 and FIG. 4, each of the main portion cover 31 and the side portion cover 32 is formed as a planar body by stacking a first thin cover pad (first cover pad) 30b1 and a second thin cover pad (second cover pad) 30b2 on a reverse surface of a covering material 30a and integrating the first cover pad 30b1, the second cover pad 30b2, and the covering material 30a. The covering material 30a has a poor stretching property and a favorable external appearance. Genuine leather is used as the covering material 30a in this embodiment. However, instead of the genuine leather, artificial leather, woven fabric, knitted fabric, or the like may be also employed. The first cover pad 30b1 and the second cover pad 30b2 are made of the same materials. In this embodiment, a material in which one surface of a urethane slab pad 30b11 with a thickness of 5 mm is laminated with stretchy reverse base cloth 30b12 such as jersey knit (i.e., the stretchy reverse base cloth 30b12 is disposed on one surface of the urethane slab pad 30b11) is used for each of the first cover pad 30b1 and the second cover pad 30b2. However, the reverse base cloth 30b12 may be eliminated as long as absence thereof does not cause a problem during sewing work. The surrounding portion cover 33 is formed of only the covering material 30a, and thus the first cover pad 30b1 and the second cover pad 30b2 are not disposed thereon. Here, the first cover pad 30b1 and the second cover pad 30b2 may be regarded as "a first cover pad" and "a second cover pad" according to the disclosure, respectively.

The plurality of parts is manufactured as follows. The parts are integrated by sewing to form the back cover 30. First, the covering material 30a, the first cover pad 30b1, and the second cover pad 30b2 are cut in accordance with a shape of each of the parts. The parts mentioned here include the upper intermediate main portion cover 31a1, the upper right main portion cover 31a2, the upper left main portion cover 31a3, and the like. Before the covering material 30a, the first cover pad 30b1, and the second cover pad 30b2 are cut in accordance with the shape of each of the parts, a seam allowance for sewing should be secured in an outer peripheral portion of each of the parts. Next, in each of the parts, a surface of the first cover pad 30b1 that is not laminated with the reverse base cloth 30b12 (i.e., a surface of the first cover pad 30b1 located on a side where the reverse base cloth 30b12 is not disposed), and the reverse surface of the covering material 30a are bonded and integrated by using a hot-melt adhesive. In a bonding method, the hot-melt adhesive is applied by a roll coater to the surface of the first cover pad 30b1 that is not laminated with the reverse base cloth 30b12. Then, the surface with the hot-melt adhesive is superposed on and pressed against the reverse surface of the covering material 30a before the hot-melt adhesive hardens. However, the bonding method is not limited thereto. A solvent-type adhesive may be used for bonding, or means such as flame lamination may be used for integration. Next, a surface of the second cover pad 30b2 that is not laminated with the reverse base cloth 30b12 (i.e., a surface of the second cover pad 30b2 located on a side where the reverse base cloth 30b12 is not disposed) is superposed on the surface (the reverse base cloth 30b12-side surface) of the first cover pad 30b1 located on a side where the reverse base cloth 30b12 is disposed, and an outer periphery of the part is sewn such that the second cover pad 30b2 is integrated with the covering material 30a and the first cover pad 30b1. In this way, each of the parts is obtained. Note that the second cover pad 30b2 may be bonded to the first cover pad 30b1.

Figure 5:
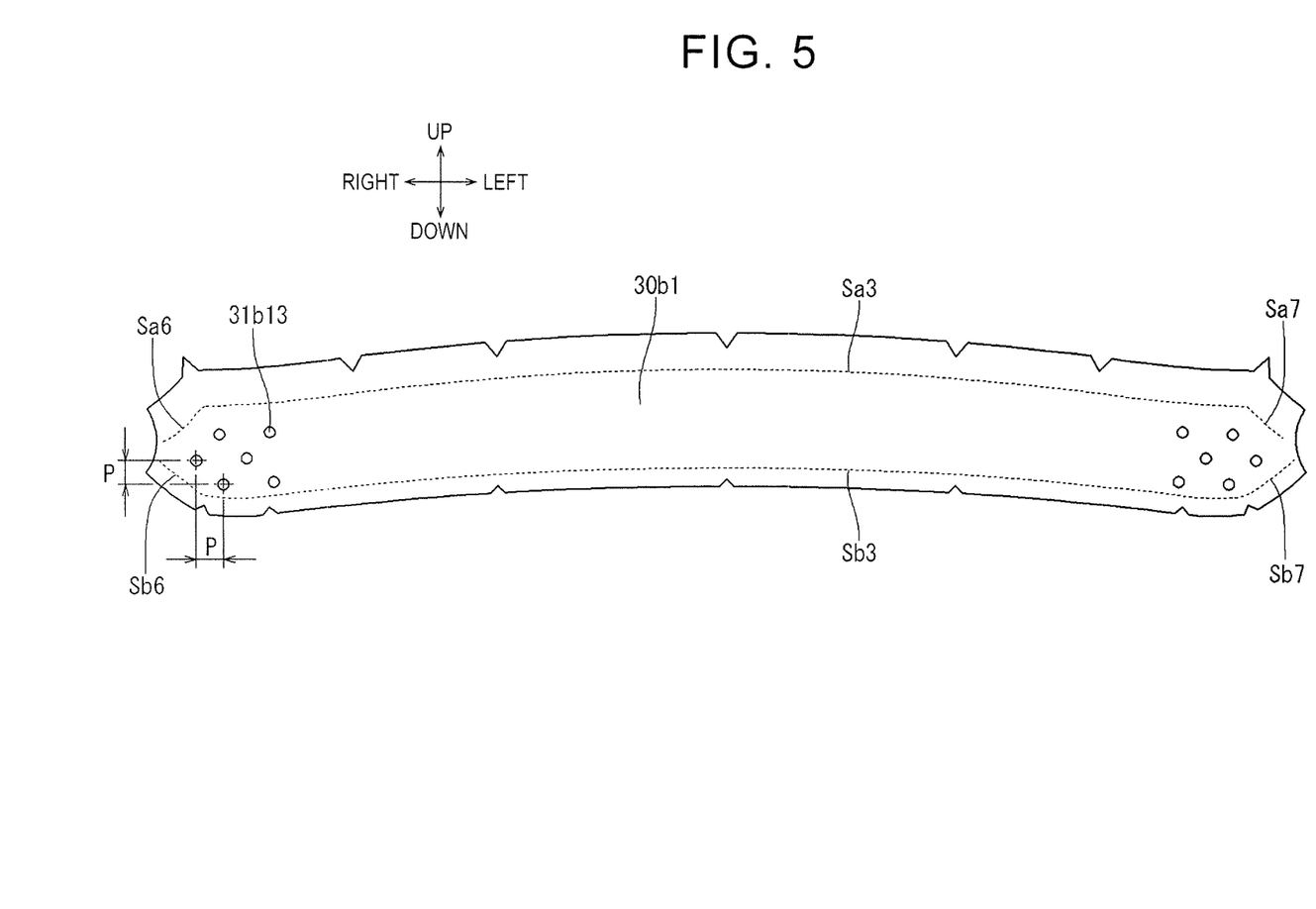
FIG. 5 is a plan view of a cover pad in an isolation portion part of a back cover in the embodiment.

FIG. 5 shows the first cover pad 30b1 in the intermediate main portion cover 31c before being sewn. The second cover pad 30b2 in the intermediate main portion cover 31c before being sewn is not illustrated. However, the second cover pad 30b2 in the intermediate main portion cover 31c before being sewn is identical to the first cover pad 30b1 in the intermediate main portion cover 31c before being sewn. In the first cover pad 30b1 in the intermediate main portion cover 31c, six holes 31b13 are provided in each of right and left end portions such that the six holes 31b13 extend through the first cover pad 30b1 in the thickness direction of the first cover pad 30b1. Each of the right end portion and the left end portion is configured as follows. Each of the holes 31b13 has a diameter of 3 mm. In a grid pattern in which a pitch P between grid points is 7 mm in the right-left direction and in the up-down direction, the holes 31*b*13 are disposed at every other grid point in the right-left direction and in the up-down direction. In FIG. 5, broken lines represent the sewing lines, and the upper sewing line represents the sixth upper sewing line Sa6, the third upper sewing line Sa3, and the seventh upper sewing line Sa7 from the right. The lower sewing line represents the sixth lower sewing line Sb6, the third lower sewing line Sb3, and the seventh lower sewing line Sb7 from the right. That is, a right-side region where the holes 31*b*13 are provided corresponds to an interrupted portion between the sixth upper sewing line Sa6 and the sixth lower sewing line Sb6 where the fourth upper sewing line Sa4 is not continuous with the fourth lower sewing line Sb4. In addition, a left-side region where the holes 31*b*13 are provided corresponds to an interrupted portion between the seventh upper sewing line Sa7 and the seventh lower sewing line Sb7 where the fifth upper sewing line Sa5 is not continuous with the fifth lower sewing line Sb5. Each of these interrupted portions may be regarded as "an isolation portion that is not sewn" according to the disclosure. The holes 31*b*13 may be regarded as "through holes" according to the disclosure.

This embodiment that is configured as described so far exerts the following operational effects. When the intermediate main portion cover 31*c* is disposed on the back pad 3P such that the reverse base cloth 30*b*12 of the second cover pad 30*b*2 as a reverse surface portion of the intermediate main portion cover 31*c* extends along the recessed surface portion of the back pad 3P, the intermediate main portion cover 31*c* is curved (bent) to be recessed rearward along the recessed surface portion of the back pad 3P. At this time, a shearing force in an in-plane direction, which is generated due to bending and is applied from the first cover pad 30*b*1 to the covering material 30*a*, is reduced by deformation of the holes 31*b*13. In this way, generation of creases in the covering material 30*a* in the intermediate main portion cover 31*c* is suppressed. Therefore, the vehicle seat 1 with the favorable external appearance can be provided. Portions of the intermediate main portion cover 31*c* in which the holes 31*b*13 are provided in the first cover pad 30*b*1 and the second cover pad 30*b*2 correspond to the interrupted portion where the fourth upper sewing line Sa4 is not continuous with the fourth lower sewing line Sb4 (i.e., the interrupted portion between the fourth upper sewing line Sa4 and the fourth lower sewing line Sb4) and the interrupted portion where the fifth upper sewing line Sa5 is not continuous with the fifth lower sewing line Sb5 (i.e., the interrupted portion between the fifth upper sewing line Sa5 and the fifth lower sewing line Sb5). Each of the portions of the intermediate main portion cover 31*c* in which the holes 31*b*13 are provided in the first cover pad 30*b* and the second cover pad 30*b*2 is likely to be folded along the sewing lines, and a fold line is likely to be formed on the covering material 30*a* in each of the portions. However, due to the above-described functions of the holes 31*b*13, generation of creases in the covering material 30*a* in each of the portions is suppressed. Therefore, even when the specific design, in which the portion that is not sewn is provided between the sewing lines, is employed, the vehicle seat 1 with the favorable external appearance can be provided.

Furthermore, because the diameter of each of the holes 31*b*13 is 3 mm and thus is smaller than the thickness of 5 mm of each of the first cover pad 30*b*1 and the second cover pad 30*b*2, presence of the holes 31*b*13 is unlikely to be felt from the covering material 30*a*-side and thus the holes 31*b*13 do not worsen texture of the seat surface. In addition, the first cover pad 30*b*1 and the second cover pad 30*b*2 in the intermediate main portion cover 31*c* are each provided with the holes 31*b*13, and are stacked (i.e., superposed on each other). In this way, a shearing force in the in-plane direction, which is generated due to bending and is applied from the back pad 3P to the first cover pad 30*b*1, is reduced due to presence of the second cover pad 30*b*2 provided with the holes 31*b*13. Thus, creases are further unlikely to be generated in the covering material 30*a*.

The description has been provided so far on the particular embodiment. However, the disclosure is not limited to the external appearance and the configuration in the above embodiment. Various modifications, additions, and deletions may be made to the above embodiment within the scope of the disclosure. The followings are examples of such modifications.

In the above embodiment, the holes 31*b*13 are provided in the first cover pad 30*b*1 and the second cover pad 30*b*2 in each of the portions where creases are particularly likely to be generated in the covering material 30*a*, such as the interrupted portion where the fourth upper sewing line Sa4 is not continuous with the fourth lower sewing line Sb4 (i.e., the interrupted portion between the fourth upper sewing line Sa4 and the fourth lower sewing line Sb4). However, the disclosure is not limited to this configuration. The disclosure can be also applied to the part of the seat cover, in which the interrupted portion is not provided in the sewing line.

In the above embodiment, the disclosure is applied to the seat back 3 of the vehicle seat 1. However, the disclosure can be also applied to the seat cushion 2, the headrest, and the like. The disclosure can be further applied to seats for a train, an aircraft, a vessel, and the like.

What is claimed is:

1. A vehicle seat comprising:
a seat pad that defines an outer shape of the vehicle seat and configured to elastically support a body of a seated occupant; and
a seat cover that is defined by a plurality of parts sewn together, the seat cover covering a seating surface of the seat pad, wherein
the seating surface includes a recessed surface portion that is recessed in a thickness direction of the seat pad, the recessed surface portion is covered with the seat cover such that sewing lines face the recessed surface portion, the plurality of parts being sewn at the sewing lines, the sewing lines are formed on a same imaginary line such that an isolation portion that is not sewn is provided between the sewing lines,
the seat cover includes a covering material and a first cover pad that is disposed on and fixed to a reverse surface of the covering material, and
a plurality of through holes are provided in the first cover pad at left end and right end portions of the first cover pad, the plurality of through holes extending through the first cover pad in a thickness direction of the first cover pad, and the plurality of through holes in the first cover pad being provided in an isolation portion part of the isolation portion.

2. The vehicle seat according to claim 1, wherein a diameter of each of the plurality of through holes is smaller than a thickness of the first cover pad.

3. A vehicle seat comprising:
a seat pad that defines an outer shape of the vehicle seat and configured to elastically support a body of a seated occupant; and a seat cover that is defined by a plurality of parts sewn together, the seat cover covering a seating surface of the seat pad, wherein the seating surface includes a recessed surface portion that is recessed in a thickness direction of the seat pad, the seat cover includes a covering material, a first cover pad that is disposed on and fixed to a reverse surface of the covering material, and a second cover pad that is disposed on a surface of the first cover pad, the surface of the first cover pad being on a side opposite to a side where the covering material is disposed, and a plurality of through holes are provided in the first cover pad and the second cover pad at left end and right end portions of the first cover pad and the second cover pad, the plurality of through holes extending through the first cover pad and the second cover pad in a thickness direction of the first cover pad and the second cover pad, and the plurality of through holes in the first cover pad and the second cover pad being provided in the recessed surface portion.

4. A vehicle seat comprising:

a seat pad that defines an outer shape of the vehicle seat and configured to elastically support a body of a seated occupant; and a seat cover that is defined by a plurality of parts sewn together, the seat cover covering a seating surface of the seat pad, wherein the seating surface includes a recessed surface portion that is recessed in a thickness direction of the seat pad, the seat cover includes a covering material and a first cover pad that is disposed on and fixed to a reverse surface of the covering material, and a plurality of through holes are provided in the first cover pad in a portion of the seat cover, the plurality of through holes extending through the first cover pad in a thickness direction of the first cover pad, and the portion of the seat cover corresponding to the recessed surface portion, wherein the recessed surface portion is covered with the seat cover such that sewing lines face the recessed surface portion, the plurality of parts being sewn at the sewing lines, the sewing lines are formed on a same imaginary line such that an isolation portion that is not sewn is provided between the sewing lines, and the plurality of through holes is provided in the first cover pad in an isolation portion part, the isolation portion part being disposed to correspond to the isolation portion.

5. The vehicle seat according to claim 4, wherein a diameter of each of the plurality of through holes is smaller than a thickness of the first cover pad.

6. The vehicle seat according to claim 4, wherein a second cover pad is disposed on a surface of the first cover pad, the surface of the first cover pad being on a side opposite to a side where the covering material is disposed, and the plurality of through holes is provided in the second cover pad.

\* \* \* \* \*